(12) United States Patent
Nikitin et al.

(10) Patent No.: US 8,692,182 B2
(45) Date of Patent: Apr. 8, 2014

(54) RUGGEDIZED HIGH TEMPERATURE COMPATIBLE RADIATION DETECTOR

(75) Inventors: Anton Nikitin, Houston, TX (US); Rocco DiFoggio, Houston, TX (US); Alexandr Vinokurov, Novosibirsk (RU); Mikhail Korjik, Minsk (BY)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/275,775

(22) Filed: Oct. 18, 2011

(65) Prior Publication Data

US 2012/0267519 A1 Oct. 25, 2012

Related U.S. Application Data

(60) Provisional application No. 61/408,288, filed on Oct. 29, 2010.

(51) Int. Cl.
*G01V 5/04* (2006.01)

(52) U.S. Cl.
USPC .......................................................... 250/256

(58) Field of Classification Search
USPC .......................................................... 250/256
See application file for complete search history.

(56) References Cited

U.S. PATENT DOCUMENTS

| | | | |
|---|---|---|---|
| 4,529,877 A | 7/1985 | Arnold | |
| 4,638,158 A | 1/1987 | Sonne et al. | |
| 4,958,073 A | 9/1990 | Becker et al. | |
| 5,055,669 A * | 10/1991 | Blake et al. | 250/214 AL |
| 5,420,959 A | 5/1995 | Walker et al. | |
| 5,434,415 A * | 7/1995 | Terada et al. | 250/368 |
| 5,528,029 A | 6/1996 | Chapellat et al. | |
| 5,900,627 A | 5/1999 | Odom et al. | |
| 6,207,953 B1 | 3/2001 | Wilson | |
| 6,639,210 B2 | 10/2003 | Odom et al. | |
| 6,666,285 B2 | 12/2003 | Jones et al. | |
| 6,738,720 B2 | 5/2004 | Odom et al. | |
| 6,838,741 B2 | 1/2005 | Sandvik et al. | |
| 7,002,156 B2 * | 2/2006 | Sandvik et al. | 250/370.11 |
| 7,019,284 B2 | 3/2006 | Srivastava et al. | |
| 7,292,942 B2 | 11/2007 | Ellis et al. | |
| 7,309,857 B2 | 12/2007 | Gardner | |
| 7,763,845 B2 | 7/2010 | Estes et al. | |

(Continued)

FOREIGN PATENT DOCUMENTS

EP 1707613 A1 10/2006

OTHER PUBLICATIONS

Mazzillo et al., Highly Efficient Low Reverse Biased 4H-SiC Schottky Photodiodes for UV-Light Detection, Dec. 1, 2009, IEEE Photonics Technology Letters, vol. 21., pp. 1782-1784.*

(Continued)

*Primary Examiner* — Christine Sung
(74) *Attorney, Agent, or Firm* — Cantor Colburn LLP

(57) ABSTRACT

Disclosed is an apparatus configured to detect radiation at high temperatures in a borehole penetrating the earth. The apparatus includes a scintillation material that interacts with the radiation to generate photons, at least one solid-state photodetector optically coupled to the scintillation material and configured to detect the radiation by detecting the generated photons, and at least one optical element disposed between the scintillation material and the at least one solid-state photodetector and configured to concentrate the photons generated in the scintillation material onto the at least one solid-state photodetector.

19 Claims, 6 Drawing Sheets

(56) References Cited

U.S. PATENT DOCUMENTS

| | | | |
|---|---|---|---|
| 8,039,792 | B2 | 10/2011 | Nikitin et al. |
| 8,071,937 | B2 | 12/2011 | Troxler |
| 2008/0011957 | A1* | 1/2008 | Williams et al. ............. 250/368 |
| 2009/0014056 | A1 | 1/2009 | Hockaday |
| 2009/0200480 | A1 | 8/2009 | Clothier et al. |
| 2010/0090111 | A1* | 4/2010 | Stoller et al. ................. 250/337 |
| 2010/0187413 | A1 | 7/2010 | DiFoggio et al. |
| 2010/0223010 | A1 | 9/2010 | Nikitin et al. |
| 2010/0252724 | A1 | 10/2010 | Inanc et al. |
| 2010/0314535 | A1 | 12/2010 | Zhang et al. |
| 2011/0012015 | A1 | 1/2011 | Evans et al. |
| 2011/0060526 | A1 | 3/2011 | Faivre et al. |
| 2011/0191030 | A1 | 8/2011 | Roberts |
| 2011/0204216 | A1 | 8/2011 | Moake et al. |
| 2013/0053686 | A1* | 2/2013 | Pani ............................. 600/424 |

OTHER PUBLICATIONS

Gektin et al., LiCaAlF6:Ce crystal: a new scintillator, 2002, Nuclear Instruments and Methods in Physics Research, vol. 487, pp. 274-277.*

H.-Y. Cha, S., et al., "Temperature Dependent Characteristics of Nonreach-Through 4H-SiC Separate Absorption and Multiplication APDs for UV Detection" IEEE Sensors Journal, vol. 8., No. 3, Mar. 2008, pp. 233-237.

G. Knoll, Radiation detection and measuremnts, "VII. Counting Efficiency". John Wiley & Sons, Inc. (2000). pp. 212-213.

M. Mickael, et al. "Characterization, and Field Experience of New High-Temperature, Azimuthal, and Spectral Gamma Ray Logging-While-Drilling Tools" SPE 77481, SPE Annual Technical Conference and Exhibition held in San Antonio, TX, Sep. 29-Oct. 2, 2002.

McKigney, E. A. et al "LaF3:Ce nanocomposite scintillator for gamma-ray detection" Hard X-Ray and Gamma-Ray Detector Physics IX. Edited by James, Ralph B.; Burger, Arnold; Franks, Larry A. Proceedings of the SPIE, vol. 6706, pp. 67061A-67061A. 11 pages, (2007).

P.Lecoq, et al, Inorganic Scintillators for Detector Systems, Spinger, "Physical Principes and Crystal Engineering". 2006, pp. 48-51.

Reshak, et al. "Optical second harmonic generation in Yttrium Aluminum Borate Single crystals (theoretical simulation and experiment". PMC Physics B, PhysMath Central, Research Article. Published on Mar. 17, 2008. 16 pages.

Experimental techniques of neutron studies•, Moscow, Energoatomizdat, 1990, in Russian.

T. Ashley, et al. "Optical Concentrators for Light Emitting Diodes." SPIE vol. 3289, (1998), pp. 43-50.

X. Bai, et al. "High Detection Sensitivity of Ultraviolet 4H-SiC Avalanche Photodiodes" IEEE Journal of Quantum Electronics, Vo. 43. No. 12., Dec. 2007. pp. 1159-1162.

Y. Arikawa et al. "Pr3+-doped fluoro-oxide lithium glass as scintillator for nuclear fusion diagnostics" Review of Scientific Instruments 2009, 80, 113504. 4 pages.

Harsh-Environment Solid-State Gamma Detector for Downhole Gas and Oil Exploration DE-FC26-04NT42107 Performer: General Electric Global Research Center DE-FC26-04NT42107 Goal The goal is to develop . . . [retrieved on Jan. 26, 2012. Retrieved from the internet:,URL www.netl.doe.gov/kmd/cds/disk11/pdfs/NT42107. pdf.

International Search Report and Written Opinion; Date of Mailing Mar. 19, 2012; International Application No. PCT/US2011/058109; Korean Intellectual Property Office; International Search report 5 pages; Written Opinion 4 pages.

* cited by examiner

RUGGEDIZED HIGH TEMPERATURE COMPATIBLE RADIATION DETECTOR

CROSS-REFERENCES TO RELATED APPLICATIONS

The present application claims the benefit of priority from U.S. Provisional Application No. 61/408,288, filed Oct. 29, 2010, the contents of which are incorporated by reference herein in their entirety.

BACKGROUND

1. Field of the Invention

The present invention relates to apparatus and method for characterizing subsurface materials from within a borehole penetrating the subsurface materials.

2. Description of the Related Art

Boreholes are drilled deep into the earth for many applications such as hydrocarbon production, geothermal production, and carbon dioxide sequestration. It is important to obtain accurate measurements of properties of subsurface materials of interest in order to efficiently use costly drilling and production resources. Typically, the measurements are performed with a downhole tool configured to be disposed in a borehole penetrating the subsurface materials in order to get close to the subsurface materials of interest.

One category of measurements is detecting and measuring radiation. The radiation can be electromagnetic such as gamma rays or particles such as neutrons. Also, the radiation can be natural or it can be induced by radiation emitted from the downhole tool. To measure radiation, the downhole tool includes a radiation detector sensitive to a particular type of radiation of interest. To be able to measure radiation accurately and reliably, the radiation detector must be able to operate and survive in a downhole environment. Unfortunately, very high temperature environment can exist deep in the borehole. In addition, when the downhole tool is disposed in a bottomhole assembly near a drill bit on a drill string, the radiation detector can be exposed to high levels of vibration and shock from drilling. It would be well received in the drilling industry if radiation detectors could be built to withstand the high temperatures and accelerations that exist in a downhole environment.

BRIEF SUMMARY

Disclosed is an apparatus configured to detect radiation at high temperatures in a borehole penetrating the earth. The apparatus includes a scintillation material that interacts with the radiation to generate photons, at least one solid-state photodetector optically coupled to the scintillation material and configured to detect the radiation by detecting the generated photons, and at least one optical element disposed between the scintillation material and the at least one solid-state photodetector and configured to concentrate the photons generated in the scintillation material onto the at least one solid-state photodetector.

Also disclosed is an apparatus configured to detect radiation at high temperatures in a borehole penetrating the earth. The apparatus includes: a downhole tool configured to be conveyed through the borehole; a scintillation material that interacts with the radiation at the high temperatures to generate photons; at least one solid-state photodetector optically coupled to the scintillation material and configured to detect the radiation by detecting the generated photons; and at least one optical element disposed between the scintillation material and the at least one solid-state photodetector and configured to concentrate the photons generated in the scintillation material onto the at least one solid-state photoconductor. The scintillation material, the at least one solid-state photoconductor, and the at least one optical element are disposed on the downhole tool.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
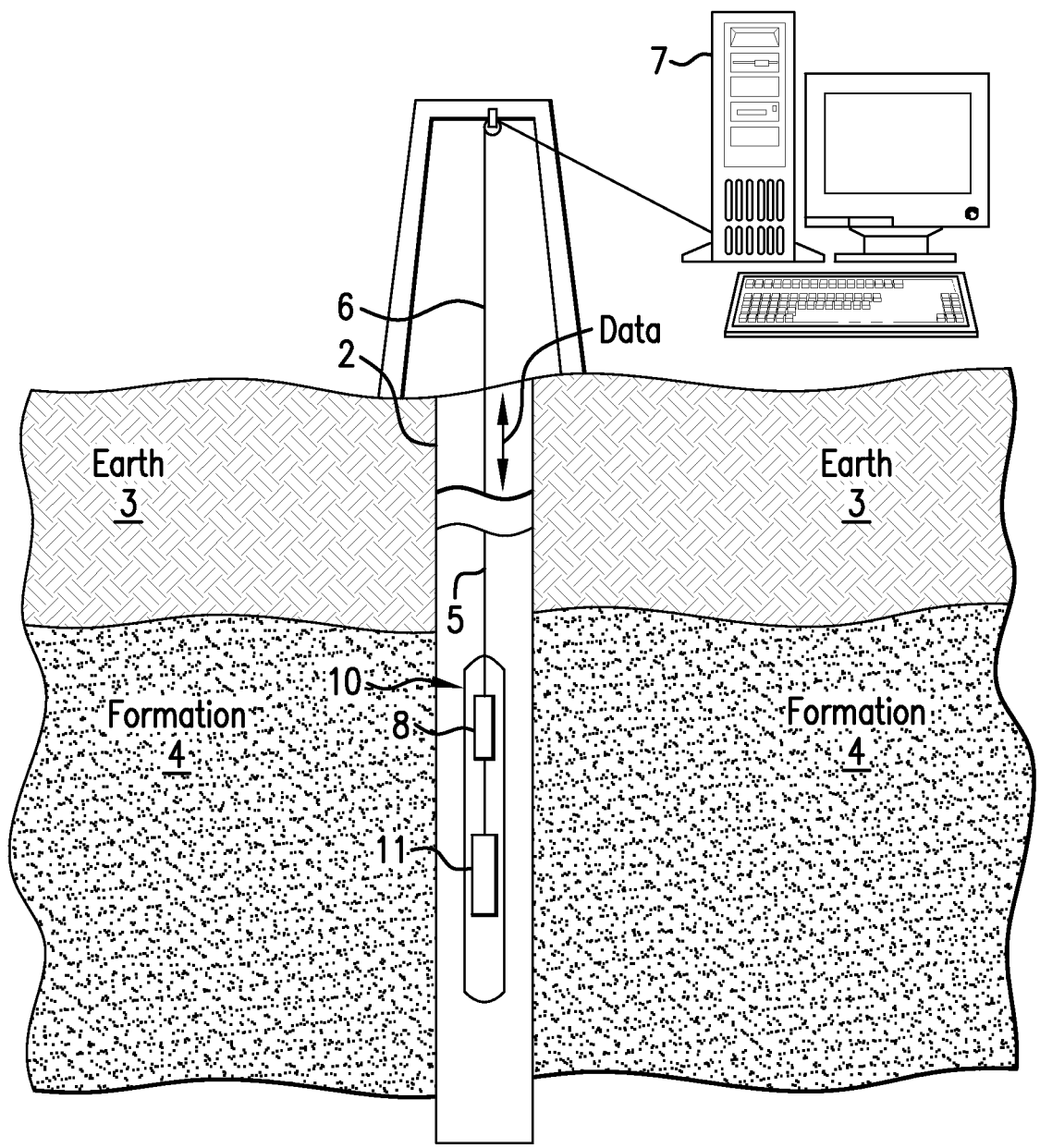
FIG. 1 illustrates an exemplary embodiment of a downhole tool having a radiation detector disposed in a borehole penetrating the earth.

A detailed description of one or more embodiments of the disclosed apparatus and method presented herein by way of exemplification and not limitation with reference to the Figures.

Disclosed are exemplary embodiments of techniques for providing radiation detectors that can operate at high temperatures (>200° C.) and high accelerations (i.e., shock and vibrations) experienced downhole. These detectors are based on gamma ray and neutron sensitive scintillation materials capable of operating at high temperatures. The ruggedness of the proposed detectors is provided by solid-state photodetectors having quantum efficiency (QE) curves that match luminescence spectra of scintillation materials. Ruggedness is also achieved by implementing the solid-state photodetectors (generally made from a semiconductor material) on integrated electronic circuit boards. One advantage to using solid-state photodetectors is that they do not require high bias voltages for operation. Different optical packaging schemes, photodetector configurations and "photodetector—crystal" optical coupling schemes for optimized performance are also described. The term "high temperatures" as used herein relates to temperatures in a borehole being at least 200° C.

For reference, the current state of radiation detection in the oil service industry is presented. Currently, the oil service industry uses several different detector types to detect gamma rays and neutrons. These are:

scintillation detectors using NaI, BGO, CsI and LaBr$_3$:Ce scintillation materials and photomultiplier tubes (PMTs) as photodetectors to detect gamma rays;

ionization detectors of Geiger—Muller tube type to perform counting gamma ray measurements;

Li-6 glass scintillation detectors to detect neutrons;

He-3 proportional counters (ionization detectors) to detect neutrons.

All these prior art detectors require high voltage for their operation. It is up to 1500 V for scintillation detectors using PMTs designed according to classical scheme (for ceramics PMT voltage is approximately 3000 V) and up to 2000 V for ionization detectors depending on the type of gas mixture in the tube. In the case of applications that require gamma ray or neutron detection at high temperature (>200° C.) and at high shocks and vibrations such high voltage power supplies fail much more often than any other parts of the detection systems (including PMTs). As a result, the lifetime of the detector is defined by the lifetime of the high voltage power supply. It should be pointed out that the higher the voltage generated by power supply source, the higher the probability of its failure is going to be at high temperatures.

In the case of the scintillation detectors, the other barrier for high temperature operation is imposed by the PMTs. Higher sensitivity of light detection requires the use of a photocathode material with low work function, large light adsorption, and large escape depth for low energy electrons. Materials that fit into such requirements have high evaporation rates and have to be deposited in the form of layers of sub micron thickness. As a result, the lifetime of a typical PMT photocathode at 200° C. is around 100 to 300 hours due to the deterioration of photocathode layer through photocathode material evaporation. This material science driven phenomenon imposes principle limits on high temperature operation of PMTs.

In general, the only particle detectors that are currently used by the industry at 200° C. are Geiger—Muller (GM) tubes for gamma ray detection. There are at least two problems with using GM tubes. One problem is with the reliability of the required high voltage power supply sources. The other drawback of GM tubes is low efficiency of detection of gamma trays (~1.5%).

Reference may now be had to FIG. 1, which provides a context for the techniques related to radiation detectors disclosed herein. FIG. 1 illustrates an exemplary embodiment of a downhole tool 10 disposed in a borehole 2 penetrating the earth 3, which includes an earth formation 4. The earth formation 4 represents any subsurface materials of interest that may be characterized by the downhole tool 10. The downhole tool 10 is conveyed through the borehole 2 by a carrier 5. In the embodiment of FIG. 1, the carrier 5 is an armored wireline 6. Besides supporting the downhole tool 10 in the borehole 2, the wireline 6 can also provide communications between the downhole tool 10 and a computer processing system 7 disposed at the surface of the earth 3. The computer processing system 7 is configured to record and/or process measurements performed by the downhole tool 10. In logging-while-drilling (LWD) or measurement-while-drilling (MWD) embodiments, the carrier 5 can be a drill string. In order to operate the downhole tool 10 and/or provide a communications interface with the surface computer processing system 6, the downhole tool 10 includes downhole electronics 8.

Still referring to FIG. 1, the downhole tool 10 includes a radiation detector 11 for performing radiation measurements related to characterizing the formation 4. The radiation detector 11 is configured to detect electromagnetic and/or particle radiation. The term "detect" as used herein is inclusive of measuring the detected radiation. Non-limiting embodiments of detecting radiation include a number of counts, a count-rate, and energy of the detected radiation. Although not shown, the downhole tool 10 can include other components for characterizing the formation 4 such as a formation fluid tester or a pulsed-neutron source for irradiating the formation 4 with neutrons to induce the generation of gamma rays. Pulsed-neutron logging is particularly useful in determining porosity, thermal neutron cross-section, or elemental composition of the formation 4.

The techniques for providing the radiation detector 11 that can operate at high downhole temperatures and high accelerations call for using a solid-state photodetector made of wide band gap semiconductor materials coupled to a scintillation material. Avalanche photodiodes (APDs) made of SiC are capable of operating up to 220° C. But at the same time, the luminescence spectrum of scintillation material should match quantum efficiency (QE) curve of the associated APD. In the case of a SiC APD, the desired wavelength range of the scintillation material is between 250 and 320 nm depending on the detailed design of the APD device and type of SiC material used. Thus, in one embodiment, the radiation detector 11 can be built using the SiC APD coupled to a scintillation material with high light yield (LY) at high temperatures. The light yield dependence on temperature is described by the function, LY(Temperature).

The high values of LY at high temperatures are provided by the favorable combination of the properties of the crystal matrix of the scintillation material and luminescence centers in charge of the scintillation. Scintillation materials which possess such properties are monocrystalline oxide compounds activated by Ce$^{3+}$ and Pr$^{3+}$ ions. The scintillation process in these compounds is provided by the interconfiguration radiation transitions 5d→f(Ce$^{3+}$) and 4f5d→f$^2$(Pr$^{3+}$). For example, such scintillation material as YAlO$_3$:Ce has a high LY parameter, a fast scintillation process, and a LY that is stable up to 100° C. Partial replacement of yttrium with lutetium decreases the LY value but improves LY(Temperature) dependence making it stable up to 150° C. The LY(Temperature) dependence of the scintillation material can be improved in the high temperature range through its activation by Pr$^{3+}$ ions. Scintillation crystal of lutetium aluminum garnet doped with Pr (Lu$_3$Al$_5$O$_{12}$:Pr or LAG:Pr) demonstrates stable dependence of LY(Temperature) at temperatures as high as 170° C. At the same time, Lu contains substantial amount of naturally radioactive isotope, which emits alpha particles. The self-radiation background created by these alpha particles in the signal of the scintillation detector based on LAG:Pr makes it challenging to use such detectors to perform natural gamma ray well logging measurements.

Better dependence of LY(Temperature) at high temperatures (i.e., less decrease of LY with temperature increase) for scintillation materials activated by Pr$^{3+}$ in comparison with scintillators based on the same matrix and activated by Ce$^{3+}$ is due to faster kinetics of interconfigurational radiative transitions. For Pr$^{3+}$ it is approximately two times faster than for Ce$^{3+}$. Because of this fact, the influence of non-radiative relaxations of the excited electronic states on the scintillation process is smaller for materials doped with Pr$^{3+}$.

The quenching of interconfigurational luminescence of Pr$^{3+}$ ions can be caused by the following processes:

non-radiative transitions of excited electronic states on low f levels of $^3P_{0,1,2}$ configuration;

thermally induced transition of the excited electron from radiative 4f5d state to higher $^1S_0$ level of f$^2$ electronic configuration; and thermally induced ionization of radiative 4f5d state into conductive band.

All these processes depend on the temperature of the photodetector. LY values and forms of LY(Temperature) dependence at high temperature are defined by mutual location of electronic levels 4f5d and $^1S_0$ of $f^2$ electronic configuration of $Pr^{3+}$ ions in the band gap of the electronic structure of the scintillation material matrix. For example, in the case of thermally induced ionization of radiative 4f5d state into conductive band, the gap between the low energy boundary of conduction band and 4f5d state $\Delta E_2$ defines this quenching mechanism: larger $\Delta E_2$ provides weaker LY(Temperature) dependence on temperature. Table 1 shows several parameters of the scintillation crystals doped with Pr ions and such parameters of electronic structure of these materials as band gap $E_b$, energy of $^1S_0$ state, energy of radiative state 4f5d calculated using Stokes shift value ($E_r$), energy gap between $^1S_0$ state and radiative state 4f5d ($\Delta E_1$), energy gap between the low boundary of conductive band and radiative state 4f5d ($\Delta E_2$). The Light Yield parameter was measured for 1 mm thick slabs of material.

TABLE 1

| Crystal | Light Yield, ph/MeV | Decay time, ns | 4f 5d → f² luminescence maximum, nm | Band gap, eV | $E_r$, eV | $\Delta E_1$, eV | $\Delta E_2$, eV |
|---|---|---|---|---|---|---|---|
| $Y_3Al_5O_{12}$:Pr | 9250 | 23.4 | 310, 380 | 6.4 | 4.3 | 1.7 | 2.1 |
| $YAlO_3$:Pr | 7050 | 13.3 | 260, 295 | 7.8 | 5.2 | 0.8 | 2.6 |
| $Y_2SiO_5$:Pr | 4580 | 6.5, 33 | 270, 305 | 6.3 | 4.6 | 1.4 | 1.7 |
| $Lu_3Al_5O_{12}$:Pr | 10000 | 25, 210 | 305, 370 | 6.4 | 4.3 | 1.7 | 2.1 |

The data presented in Table 1 indicate that yttrium aluminum perovskite $YAlO_3$:Pr (YAP:Pr) has the largest $E_b$ parameter. As a result, the contribution of the thermally induced ionization of the radiative states into the scintillation quenching process is the smallest among materials shown above. While $\Delta E_1$ value for $Pr^{3+}$ ions in YAP:Pr is the lowest, its absolute value is high enough to make the transition of the excited electron states 4f5d into localized $^1S_0$ state negligible in comparison with thermally induced ionization. As a result, for YAP:Pr, the LY(Temperature) dependence on temperature is the weakest among all materials under consideration.

Figure 2:
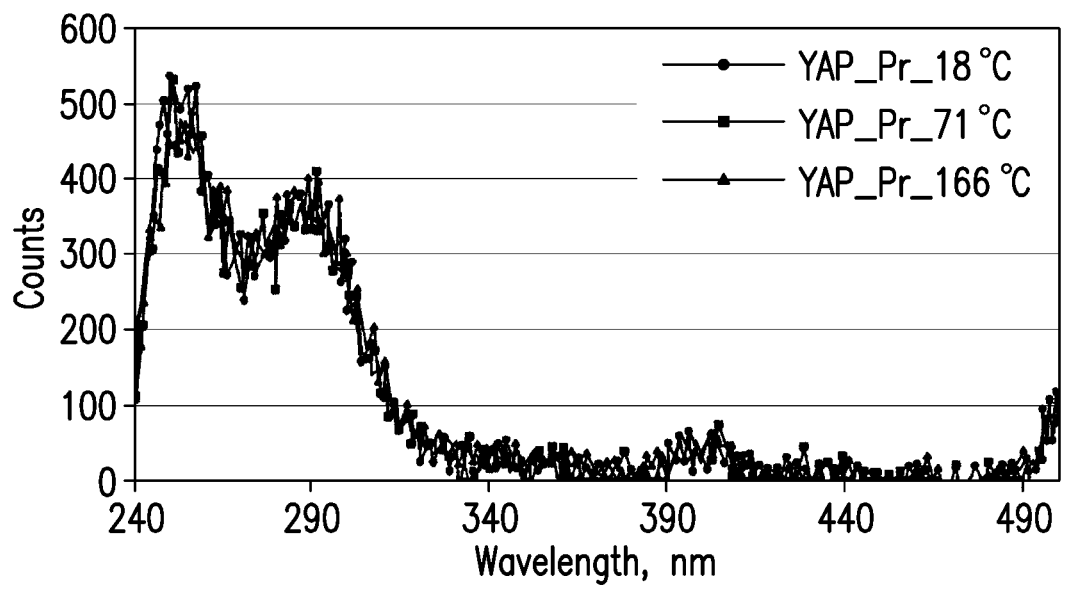
FIG. 2 illustrates radioluminescence spectra of YAP:Pr.
Figure 3:
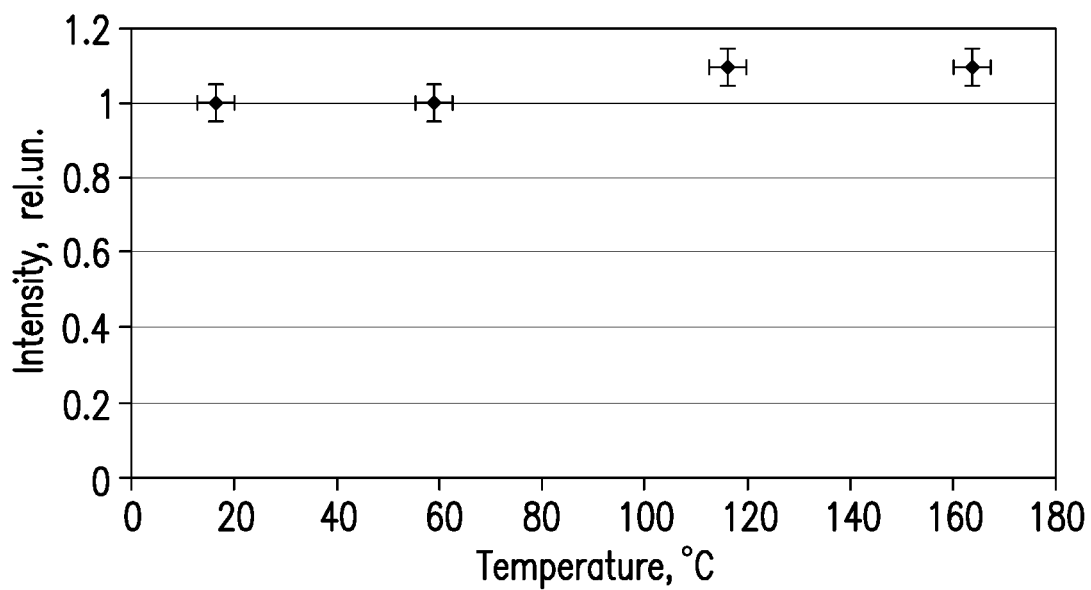
FIG. 3 illustrates the dependence of integrated intensity of radioluminescence spectra of YAP:Pr at different temperatures.

Reference may now be had to FIG. 2, which shows radioluminescence spectra of YAP:Pr crystal grown from the melt with 0.05 atomic % Pr concentrations. These spectra show that emitted light intensity locates deeper in UV wavelength range in comparison with other materials and matches almost ideally to quantum efficiency curve of SiC APD. Also, the shapes of spectra measured at different temperatures are very close. This indicates the stability of LY of YAP:Pr up to at least 170° C. The dependence of normalized integrated intensity of measured spectra on the temperature (for the YAP:Pr crystal grown from the melt with 0.05 atomic % Pr concentration) shown in FIG. 3 confirms that LY(Temperature) does not decrease with temperature increase. The intensity values in FIG. 3 are normalized by the intensity value of the spectrum measured at room temperature.

Figure 4:
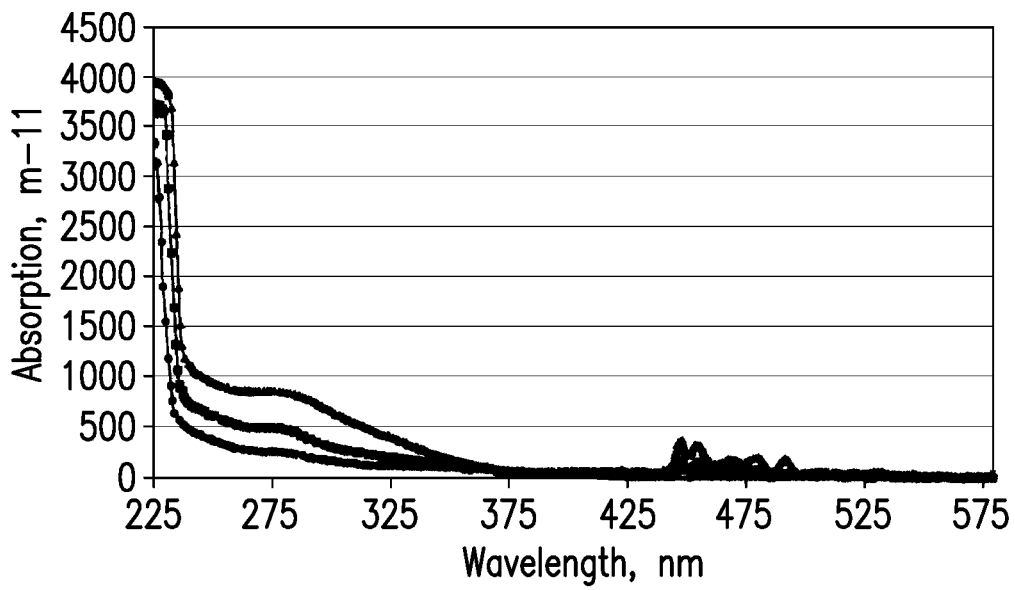
FIG. 4 illustrates adsorption spectra of YAP:Pr.
Figure 5:
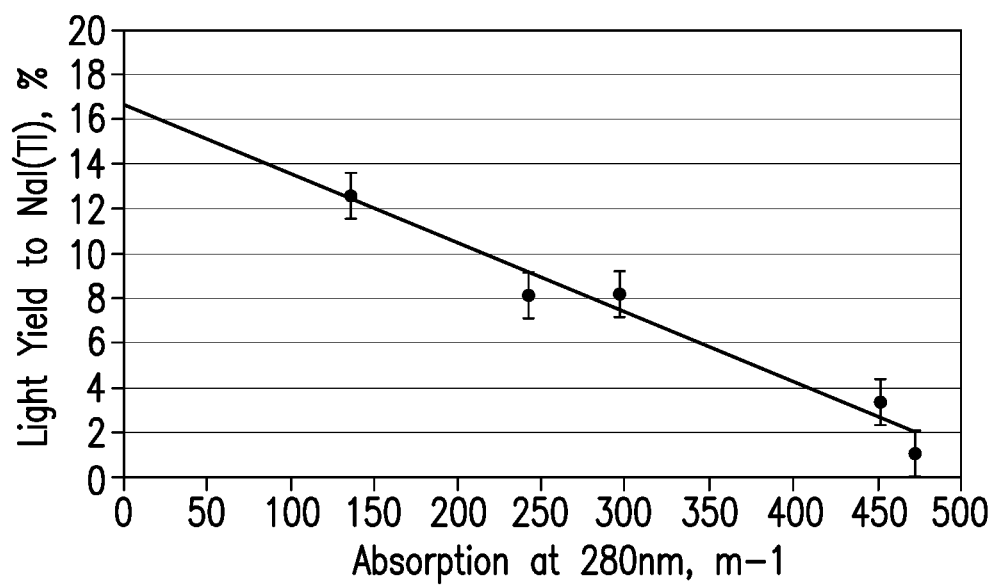
FIG. 5 illustrates dependence of light yield of YAP:Pr on the sample adsorption at 280 nm.

High detection efficiency of the radiation detector 11 configured to detect gamma rays is provided by using scintillation crystals of large volumes (tens of cm³) and linear dimensions (tens of cm). In this case, the self-adsorption of scintillation light in the scintillation crystal itself becomes a challenge on a way to create large volume detector. If self-adsorption is high when most of the light emitted in the scintillation event is adsorbed in the crystal on the way to the photodetector, then the detectable signal may be weak. FIG. 4 shows adsorption spectra of three different samples of YAP:Pr grown in different experiments. Substantial adsorption takes place in the wavelength range of interest between 250 nm and 320 nm. One of the potential causes of the observed adsorption is the presence of the $Pr^{4+}$ ions in the crystal matrix. The dependence of the LY parameter on the adsorption at 280 nm for samples of YAP:Pr material grown in different runs is shown in FIG. 5. From this plot, the maximum of the LY parameter of YAP:Pr can be estimated if ideal material has close to zero adsorption in the range of wavelengths where most of the radioluminescence intensity is located. It is equal to 17-18% of LY of NaI(Tl).

From the data presented above, it is shown that the radiation detector 11 configured to detect gamma rays and based on SiC APD and YAP:Pr can operate at high temperatures. This configuration of the radiation detector 11 can be used as a counter or as a spectrometer when using YAP:Pr crystals with large volume and with low light self-adsorption in wavelength range between 250 nm and 320 nm (with low concentration of $Pr^{4+}$ contaminants).

Next, configurations of the photodetector used in the radiation detector 11 configured to detect gamma rays at high temperatures are discussed. The advantages of solid state photodetectors in comparison with PMTs are:

thickness (0.5 mm vs. approximately 40 to 90 mm); and supply voltage (less than 200 V vs. approximately 1500 V).

The main challenge in using solid-state photodetectors is the small light sensitive area as compared to PMTs (<1 mm² vs. approximately 1000 mm² for PMTs). Measures to improve light collection, alone or in combination, can be taken to overcome this challenge. A first measure is the use of arrays of single solid-state photodetector devices, or arrays of single solid-state photodetector devices built on a single piece of wafer, or both. A second measure is the use of imaging optical elements located between devices and crystals such as microlense structures of "fly eye" type or Fresnel type. A third measure is the use of non-imaging optical elements such as arrays of light concentration cones with special profile matched to the array of solid state photodetectors. These optical elements are discussed in more detail further below.

Characteristics of solid-state photodetectors, such as the small thickness and no need for high voltage for their operation, allow building all necessary electronic circuitry much smaller than in prior art downhole radiation detectors. As a result, much more volume of a housing for the detector can be filled with the scintillation material in comparison with the detector based on a PMT (currently for a typical gamma ray scintillation detector used in well logging tools, the PMT occupies about 40% of the detector volume). In addition, the overall efficiency of the detector increases as a result the increased amount of scintillation material. Such increase of the detector efficiency without the increase of the total detector volume occupied by the detector inside of the tool is important for well logging tools taking into consideration limitations imposed by the diameter of the well on the outer diameter and space inside of the well logging tools.

Figure 6:
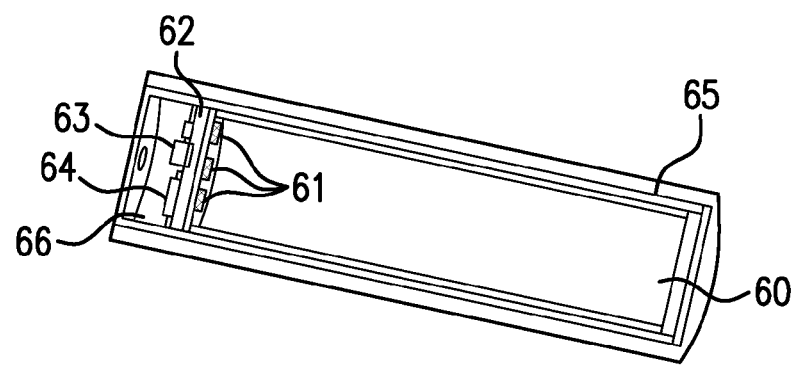
FIG. 6 depicts aspects of one configuration for internal packaging of a radiation detector configured to detect gamma rays.

Reference may now be had to FIG. 6, which illustrates one embodiment of the radiation detector 11 configured to detect gamma rays using a scintillation material 60 and an array of solid-state photodetectors 61. An electronic board 62 includes detector signal analysis electronics 63 and a low-voltage power source 64 for the array of solid-state photodetectors 61. The scintillation material 60, the array of solid-state photodetectors 61, and the electronic board 62 are disposed in a detector housing 65. In this embodiment, no additional optical elements are used. The photodetectors 61 are located on one side of the electronic board 62 while the power source 64 and the detector signal analysis electronics 63 are located on another side of the board 62. Non-limiting embodiments of the electronic board 62 include: a printed circuit board (PCB) with packaged components; a PCB with some components mounted using "chip on board" mounting method; a hybrid board with bare chips mounted from both sides; and two or more PCBs or hybrid boards stacked on top of each other with mounted solid-state photodetectors 61 at the bottom of the first board and optically coupled to the scintillation material 60 and other components mounted on other boards.

Figure 7:
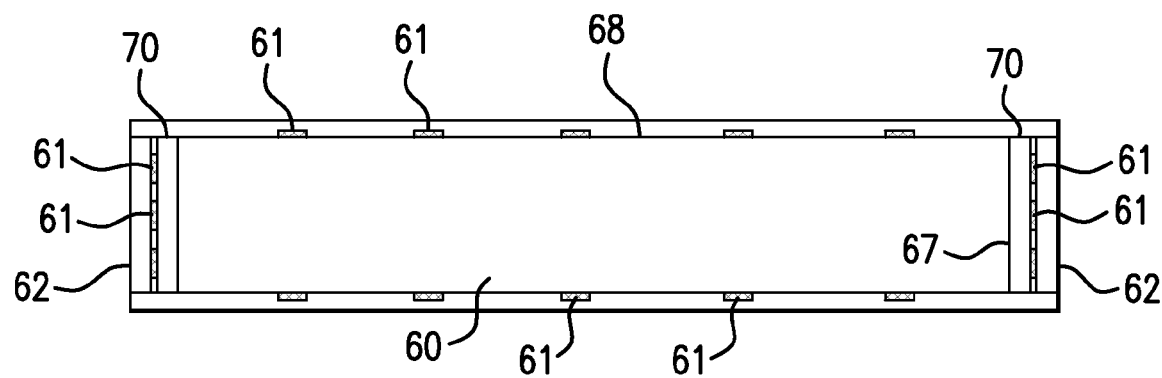
FIG. 7 depicts aspects of another configuration for internal packaging of the radiation detector configured to detect gamma rays.

Additional configurations of the solid-state photodetectors 61 at the surface of the scintillation material 60 are disclosed. Non-limiting embodiments of these configurations include: solid-state photodetectors 61 at both flat sides of the scintillation material 60 as shown in FIG. 7 where the scintillation material 60 is a crystal, such as a cylindrical scintillation crystal; an array of the solid-state photodetectors 61 distributed along the axis and circumference at the curved side of the crystal as shown in FIG. 7 (in this embodiment, to minimize the packaged crystal 60 outer diameter, all power and signal processing circuitry necessary to collect signal from the photodetectors 61 in the array should be on boards 62, which can be located adjacent to one or both flat sides of the crystal 60; or a combination of the configurations described above). In the embodiment of FIG. 7, the curved surface of the circumference of the crystal 60 is covered with a light reflective layer 68. Optical elements 70 shown in FIG. 7 can be made of "fly eye" lenses, Fresnel lenses or non-imaging optical elements designed to collect and concentrate light at the solid-state photodetectors 61.

The optical elements 70 shown in the embodiment of FIG. 7 are located only at the flat sides 67 of the scintillation crystal 60. The main reason for not using them in addition to the solid-state photodetectors 61 located at the curved side of the crystal 60 is the space limitations in the radial direction. To operate efficiently, such optical elements 70 require a substantial amount of volume and if used with photodetectors 61 at the curved side of the crystal 60, it may lead to substantial deterioration of the detector efficiency due to the decrease of the volume of the scintillation crystal 60 within a fixed volume of the detector housing 65.

It can be appreciated that an additional advantage of the use of the solid-state photodetectors 61 in the radiation detector 11 is the increased ruggedness of the detector 11 due to more uniform mass distribution inside of the detector and the use of a monolithic design when the electronic board 62 is immersed in a compound 66 (shown in FIG. 6) such as a potting compound to reduce or eliminate voids. The compound 66 can absorb shock and vibration or increase the rigidity of the radiation detector 11.

Next, the radiation detector 11 configured to detect neutrons at high temperatures is discussed. In one or more embodiments, three different nuclear reactions can be used to detect neutrons. These are:

$$n + {}^3He \rightarrow p(0.578\ MeV) + {}^3H(0.193\ MeV)(\sigma=5330\ b); \quad (1)$$

$$n + {}^6Li \rightarrow {}^3H(2.75\ MeV) + {}^4He(2.05\ MeV)(\sigma=520\ b);\ \text{and} \quad (2)$$

$$n + {}^{10} \rightarrow {}^7Li(1.0\ MeV) + {}^4He(1.8\ MeV)\ \text{(branch probability=7\%)}; \quad (3)$$

$$\rightarrow {}^7Li(0.83\ MeV) + {}^4He(1.47\ MeV) + \gamma(0.48\ MeV)$$
$$\text{(branch probability=93\%), (total } \sigma=3840\ b)$$

Figure 8:
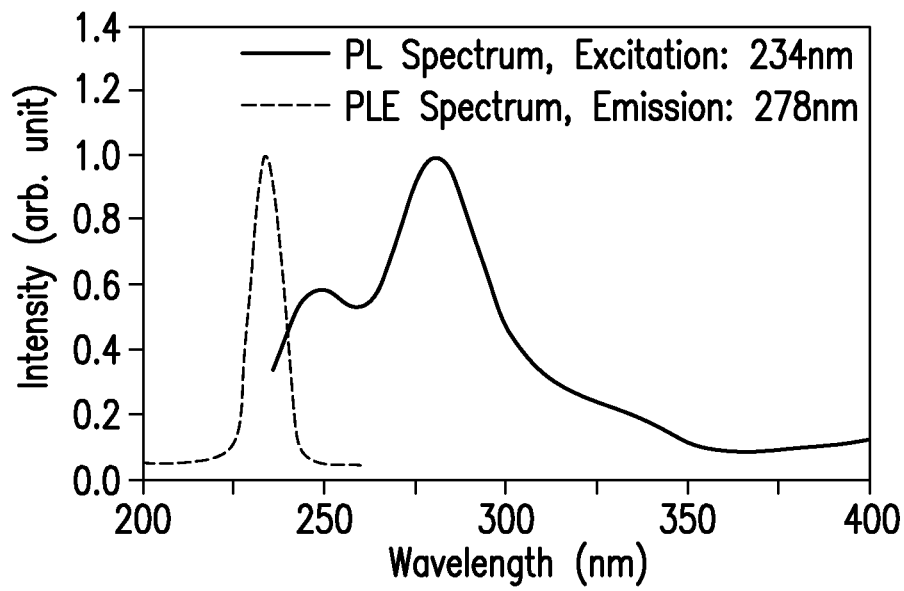
FIG. 8 (prior art) illustrates a photoluminescence excitation spectra and a photoluminescence emission spectra of Pr doped Li—F glass.

Reaction (1) requires $^3$He isotope presence; reaction (2) is based on $^6$Li isotope; and reaction (3) takes place with $^{10}$B nuclei. Charged particles emitted as a result of the neutron reaction with one of these nuclei can be detected using ionization detector (for $^3$He and $^{10}$B in the form of $BF_3$ gas) or scintillation detector (for $^6$Li and $^{10}$B in the form of different scintillation materials containing lithium and/or boron in high concentrations). Pr doped Li—F glass can work as a neutron sensitive scintillation material 50 similar to traditional Li-6 glass scintillators such as KG-2, GS-20 and GS-2. FIG. 8 shows the photoluminescence (PL) emission spectra and the photoluminescence excitation (PLE) spectra of the Pr doped Li—F glass. The PL peak is observed at 279 nm while the PLE maximum occurs at 234 nm. It can be seen from FIG. 8 that the luminescence spectrum of Pr doped Li—F glass under consideration matches well to the QE curve of SiC APD. It can be appreciated that light adsorption of Li—F glass, which constitutes the scintillation material 60 with ultraviolet (UV) wavelength range (250 nm-320 nm), is low resulting in not much adsorption of the light emitted from the scintillation process. Thus, in one or more embodiments, the radiation detector 11 configured to detect neutrons is based on Pr doped scintillation material 60 containing $^6$Li and/or $^{10}$B optically coupled to SiC APDs used as the solid-state photodetectors 51.

Except for Li—F glass doped with Pr, such single crystal scintillation materials containing lithium in the crystalline structure as $LiCaAlF_6$:Ce (LiCAF:Ce) [A. Yoshikawa, T. Yanagida, K. J. Kim, N. Kawaguchi, S. Ishizu, K. Fukuda, T. Suyama, M. Nikl, M. Miyake, M. Baba, IEEE Dresden 2008, "Crystal growth, optical properties and neutron responses of $Ce^{3+}$ doped $LiCaAlF_6$ single crystal", IEEE Nuclear Science Symposium Conference Record (2008) 1212-1214] and $LiSrAlF_6$:Ce (LiSAF:Ce) [Takayuki Yanagida, Noriaki Kawaguchi, Yutaka Fujimoto, Yuui Yokota, Atsushi Yamazaki, Kenichi Watanabe, Kei Kamada, Akira Yoshikawa, "Evaluations of Scintillation Properties of $LiSrAlF_6$ Scintillator for Thermal Neutron Detection", 2010, paper N10-13, IEEE Nuclear Science Symposium 2010, Knoxville Tenn.] show the emission of the scintillation light in the wavelength range between 280 nm and 320 nm. As a result, in one embodiment, LiCAF:Ce or LiSAF:Ce can be used as the scintillation material 60 that is sensitive to neutrons.

In the case of classical scintillation materials, these materials have to accommodate the needs of the interaction of the particle to be detected with the creation of the charged particle and the needs of charged particle energy deposition and light emission processes. In the case of compound scintillation materials sensitive to neutrons like the mixture of ZnS:Ag and $B_2O_3$ or the mixture of ZnS:Ag and $LiF_6$ powders with typical grain size approximately 1 μm bound with epoxy, the formation of a charged particle due to $(n,{}^{10}B)$ or $(n,{}^6Li)$ reaction takes place in the grains of $B_2O_3$ or $LiF_6$ and the energy deposited by such particles in ZnS:Ag is converted into visible light. In this case, different materials are responsible for the interaction of detected particles and scintillation process and properties of each material have to match to only one set of requirements for optimized performance. Because the chance of finding materials fulfilling a smaller list of requirements is higher, this approach can allow various scintillation materials with superior properties.

In one embodiment, composite scintillation materials 60 based on polymer matrix and $LaBr_3$:Ce nanoparticles are used for gamma ray detection. In this case, gamma ray interaction mainly happens in the matrix and scintillation takes place in nanoparticles. It is noted that due to such nanoscale effects as exciton multiplication and the decrease of the phonon band density of states, the scintillation process should happen in a more favorable way at high temperatures in comparison with bulk material of the same chemical composition. Exciton multiplication provides higher values of LY and the decrease of phonon states makes LY(Temperature) less dependant on temperature due to the decrease of the probability of the thermally induced ionization of excited electronic states. Also if the average size of the scintillation nanoparticle is less than ¼ of the wavelength of the light emitted in the scintillation process when emitted light does not scatter at such nanoparticles and as a result the losses of the emitted light are minimized.

It should be pointed out that in the case of the compound scintillation materials mentioned above, the light scattering at the boundaries of the grains with typical size >1 µm and related losses of the scintillation light allow the use of such scintillators only in the form of very thin layers deposited directly at PMT optical window. So the use of scintillation nanoparticles inside of the transparent matrix avoids the light scattering, and as a result detectors with large scintillation elements can be built using composite scintillators. Except for the optimization of the properties of matrix material and scintillation nanoparticles, there are two main challenges related to the design of the composite material itself. These challenges are the compatibility of the matrix material and nanoparticles (matrix should not destroy nanoparticle properties in the process of impregnation of nanoparticles into matrix and matrix should be transparent for light emitted in the scintillation process) and the filling factor of the matrix with nanoparticles (if there are too many nanoparticles, the detection efficiency is low because there is not enough matrix material for detected particles to interact with; if concentration of nanoparticles is too low, too many charged particles will not be able to reach scintillation nanoparticles and deposit their energy in the matrix).

In the case of neutron sensitive scintillation materials, because of the high cross-sections of $(n,^{10}B)$ and $(n,^{6}Li)$ reactions, the effective thickness of the matrix material in the case of composite scintillator can be relatively small (approximately 2 to 5 mm). As a result of the small thickness, some of the challenges described above tend to become irrelevant. The following approaches can be used to design neutron sensitive scintillation materials 60.

In a first approach, a polymer matrix is enriched with $^{10}B$ or $^{6}Li$ through the use of nanoparticles of boron oxides and lithium oxides and nanoparticles of Ce doped scintillation material such as $LaBr_3$:Ce, YAG:Ce, etc. as scintillation centers. The maximum of the emission spectrum of a Ce doped scintillator is around 375-420 nm and it is possible to find matrix material such as silicone based rubbers transparent in this wavelength range. At the same time, the SiC APD QE curve does not match to this wavelength range and, hence, other solid state photodetectors should be used such those made of GaN.

In a second approach, a matrix is made of $^{10}B$ enriched boron silicate glass and nanoparticles of Ce doped oxide scintillators like YAG:Ce and YAP:Ce. Nanoparticles made of oxide materials have much higher stability at high temperatures necessary for their impregnation into glass matrix (700 to 900° C.). Boron silicate glasses are transparent in the 375-420 nm wavelength range, but a GaN based APD should be used for light detection with this scintillator matrix material.

In a third approach, a fluorine based glass matrix is enriched with $^{10}B$ or $^{6}Li$ and loaded with nanoparticles made of YAG:Pr, YAP:Pr, LiCAF:Ce, LiSAF:Ce or any other scintillation material emitting light in the deep UV wavelength range. Fluorine glass is relatively transparent in this wavelength range and, as a result, light emitted by scintillation nanoparticles will be able to reach a SiC APD.

As noted above, the probability for such neutron sensitive scintillation materials to be high temperature compatible (i.e., to have values of LY at high temperatures in acceptable value range) is high due to nanoscale phenomena, favorable kinetics of scintillation at Pr and Ce ions, and favorable electronic structure of the material itself. Hence, these scintillation materials 60 are compatible with SiC and/or GaN based APDs can be used to build high temperature compatible neutron detectors.

Figure 9:
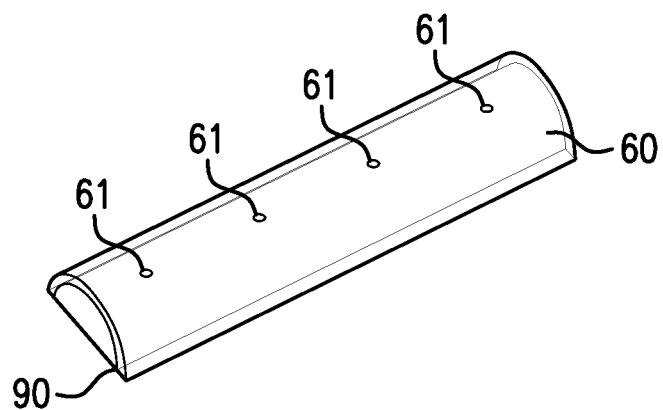
FIG. 9 depicts aspects of one configuration for internal packaging of a radiation detector configured to detect neutrons.

Next, photodetector configurations for use in the radiation detector 11 that is configured to detect neutrons are discussed. As it was noted above, because of high values of thermal neutron capture reactions involving $^{10}B$ and $^{6}Li$, the layer of the neutron sensitive scintillation material with the thickness of approximately 5 mm provides almost 100% adsorption of thermal neutrons. Hence, the techniques disclose the scintillation material 60 of the neutron detector having a large geometrical cross-section, which can have the shape of hollow cylinder or half-cylinder as shown in FIG. 9. In this embodiment, the solid-state photodetectors 61 or their arrays are located at the internal surface of the scintillation material 60. Also in this embodiment, the optical elements 70 can be used to improve light collection without the increase of the outer diameter of the radiation detector 11.

As in the case of the radiation detector 11 configured to detect gamma rays, different lens arrays and/or arrays of non-imaging optical elements can be used. The electronic board(s) 62 with power source 64 and signal analysis circuitry 63 can be located on at least one of the flat sides of the scintillation material 60 (similar to the gamma ray detector), inside of the void of scintillation material 60, or on an underside of a long flat base 90 coupled to a half-cylindrical shaped scintillation material 60 as shown in FIG. 9. In one embodiment, the base 90 can also be the electronic board 62.

As discussed above, the techniques provide various optical elements 70 for optically coupling the scintillation material 60 to the array of solid-state photodetectors 61. These optical elements 70 are required because the size of each solid-state photodetector 61 is generally much smaller than the size of the scintillation material 60. Hence, the optical elements 70 are needed to gather light that would not be detected if not for the gathering and concentrating properties of the optical elements 70.

Figure 10A:
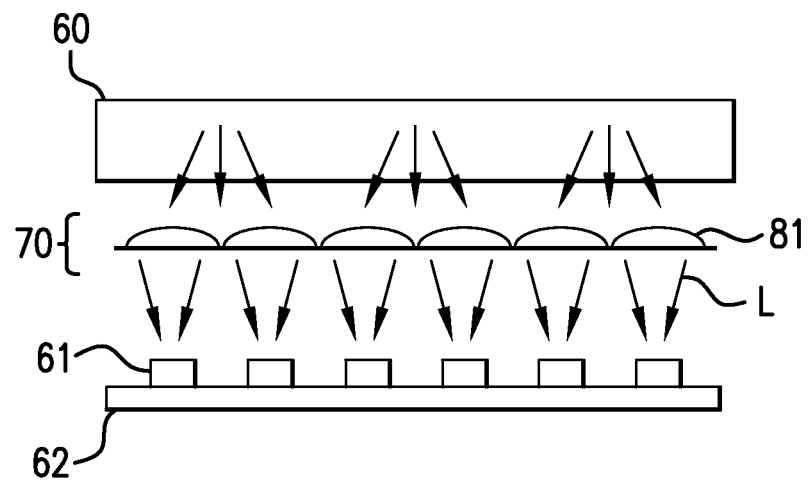
FIGS. 10A and 10B depict aspects of optical structures configured to gather and concentrate light, which is generated in a scintillation material, on an array of semiconductor photo detectors.
Figure 10B:
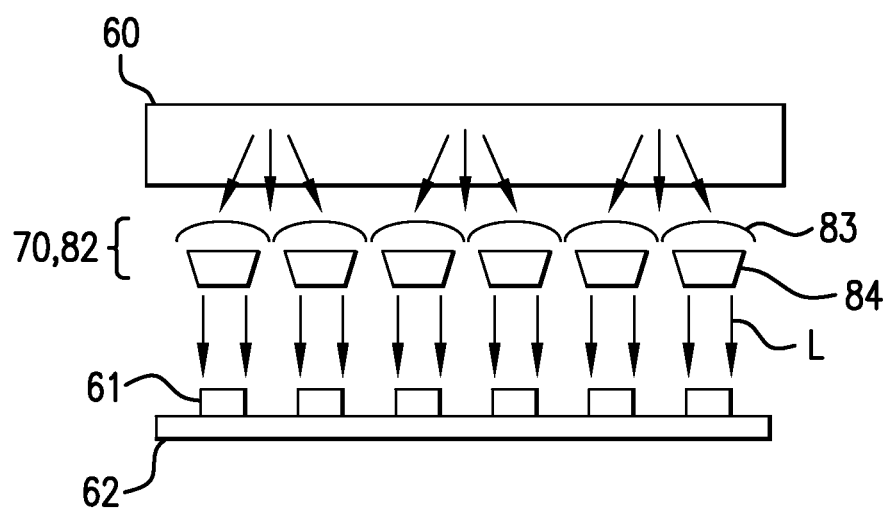

Reference may now be had to FIGS. 10A and 10B, depicting aspects of the optical elements 70. The optical elements 70 are configured to gather light L generated in the scintillation material 60 by interactions with received radiation. The gathered light L is then concentrated on one or more of the solid-state photodetectors 61. FIG. 10A illustrates an array of connected lenses 81. The array of lenses 81 focuses received light L on one or more of the solid-state photodetectors 61. In one embodiment, the lenses 81 are Fresnel lenses. FIG. 10B illustrates an array of non-imaging optical structures 82 such as mirrors formed as compound parabolic concentrators. Each non-imaging optical structure 82 includes a facet 83 for gathering light L and a cone 84 for concentrating the gathered light L onto one or more of the solid-state photodetectors 61.

In another embodiment, when scintillating nanoparticles are embedded within a transparent polymer or glass matrix, this matrix can be heated and drawn into a long optical fiber, which is then wound onto a spool. To collect the light that is produced in the fiber, one photodetector can be placed at one end of the fiber and another photodetector can be placed at the other end of the fiber, thus reducing the number of photodetectors that are needed and also eliminating the light concentrating elements of lenses and/or concentrating mirrors.

In support of the teachings herein, various analysis components may be used, including a digital and/or an analog system. For example, the downhole electronics 8, the surface computer processing 6, or the electronic board 62 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to one device being directly coupled to another device or indirectly coupled via an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus configured to detect radiation at high temperatures in a borehole penetrating the earth, the apparatus comprising:
   a scintillation material that interacts with the radiation at the high temperatures to generate photons, the scintillation material being one of a hollow cylinder and a longitudinal segment of a hollow cylinder;
   at least one solid-state photodetector optically coupled to the scintillation material and configured to detect the radiation by detecting the generated photons, the at least one solid-state photodetector including an array of solid-state photodetectors located on an outer radial surface of the hollow cylinder or the longitudinal segment of the hollow cylinder; and
   at least one optical element disposed between the scintillation material and the at least one solid-state photodetector and configured to concentrate the photons generated in the scintillation material onto the at least one solid-state photodetector.

2. The apparatus according to claim 1, wherein the at least one solid-state photodetector is an array of solid-state photodetectors, and
   the at least one optical element is an array of optical elements.

3. The apparatus according to claim 2, further comprising electronic circuitry including a low-voltage power source and signal analysis circuitry coupled to each solid-state photodetector in the array of solid-state photodetectors.

4. The apparatus according to claim 3, wherein a low voltage from the low-voltage power source is less than or equal to 200 volts.

5. The apparatus according to claim 3, wherein the scintillation material, the array of solid-state photodetectors, and the electronic circuitry are disposed in a housing.

6. The apparatus according to claim 5, further comprising a compound configured to fill voids external to the scintillation material and the array of solid-state photodetectors within the housing in order to absorb vibrations or shock.

7. The apparatus according to claim 2, wherein the array of solid-state photodetectors comprises avalanche photodiodes.

8. The apparatus according to claim 1, wherein the at least one optical element comprises at least one lens to focus a portion of the generated photons onto the at least one solid-state photodetector.

9. The apparatus according to claim 1, wherein the radiation is gamma radiation.

10. The apparatus according to claim 9, wherein the scintillation material comprises a monocrystalline oxide compound.

11. The apparatus according to claim 10, wherein the monocrystalline oxide compound is doped with at least one of cerium (Ce) ions and praseodymium (Pr) ions.

12. The apparatus according to claim 1, wherein the radiation is neutrons.

13. The apparatus according to claim 12, wherein the scintillation material comprises $LiCaAlF_6$ or $LSrAlF_6$ doped with Ce ions.

14. The apparatus according to claim 1, further comprising a detector base coupled to the longitudinal segment of the hollow cylinder and forming an interior space, wherein electronic circuitry comprising a low-voltage power source and signal analysis circuitry coupled to the at least one solid-state photodetector is disposed on the detector base external to the interior space.

15. An apparatus configured to detect radiation at high temperatures in a borehole penetrating the earth, the apparatus comprising:
a downhole tool configured to be conveyed through the borehole;
a scintillation material that interacts with the radiation at the high temperatures to generate photons, the scintillation material being one of a hollow cylinder and a longitudinal segment of a hollow cylinder;
at least one solid-state photodetector optically coupled to the scintillation material and configured to detect the radiation by detecting the generated photons, the at least one solid-state photodetector including an array of solid-state photodetectors located on an outer radial surface of the hollow cylinder or the longitudinal segment of the hollow cylinder; and
at least one optical element disposed between the scintillation material and the at least one solid-state photodetector and configured to concentrate the photons generated in the scintillation material onto the at least one solid-state photodetector;
wherein the scintillation material, the at least one solid-state photodetector, and the at least one optical element are disposed on the downhole tool.

16. An apparatus configured to detect radiation at high temperatures in a borehole penetrating the earth, the apparatus comprising:
a scintillation material that interacts with the radiation at the high temperatures to generate photons;
at least one solid-state photodetector optically coupled to the scintillation material and configured to detect the radiation by detecting the generated photons; and
at least one optical element disposed between the scintillation material and the at least one solid-state photodetector and configured to concentrate the photons generated in the scintillation material onto the at least one solid-state photodetector, the at least one optical element comprising a plurality of connected non-imaging facets, each facet being configured to collect a portion of the photons and concentrate the portion of the photons on the at least one photodetector.

17. The apparatus according to claim 16, further comprising a cone optically coupled to at least one of the non-imaging facets in order to concentrate the portion of the photons.

18. An apparatus configured to detect radiation at high temperatures in a borehole penetrating the earth, the apparatus comprising:
a scintillation material that interacts with the radiation at the high temperatures to generate photons, the scintillation material comprising a polymer matrix enriched with $^{10}B$ or $^{6}Li$ through the use of nanoparticles of boron oxides or lithium oxides and nanoparticles of oxide scintillators being doped with Ce ions;
at least one solid-state photodetector optically coupled to the scintillation material and configured to detect the radiation by detecting the generated photons, the at least one solid-state photodetector being made of GaN; and
at least one optical element disposed between the scintillation material and the at least one solid-state photodetector and configured to concentrate the photons generated in the scintillation material onto the at least one solid-state photodetector.

19. An apparatus configured to detect radiation at high temperatures in a borehole penetrating the earth, the apparatus comprising:
a scintillation material that interacts with the radiation at the high temperatures to generate photons, the scintillation material being one of a hollow cylinder and a longitudinal segment of a hollow cylinder;
at least one solid-state photodetector optically coupled to the scintillation material and configured to detect the radiation by detecting the generated photons, the at least one solid-state photodetector being an array of solid-state photodetectors, and the array of solid-state photodetectors being disposed at least one of internal to the hollow cylinder and along the longitudinal segment of the hollow cylinder; and
at least one optical element disposed between the scintillation material and the at least one solid-state photodetector and configured to concentrate the photons generated in the scintillation material onto the at least one solid-state photodetector.

* * * * *